Jan. 22, 1963 C. W. BITTNER ET AL 3,075,027
DIMERIZATION OF PROPYLENE TO 4-METHYL-1-PENTENE
Filed Nov. 10, 1959 2 Sheets-Sheet 1
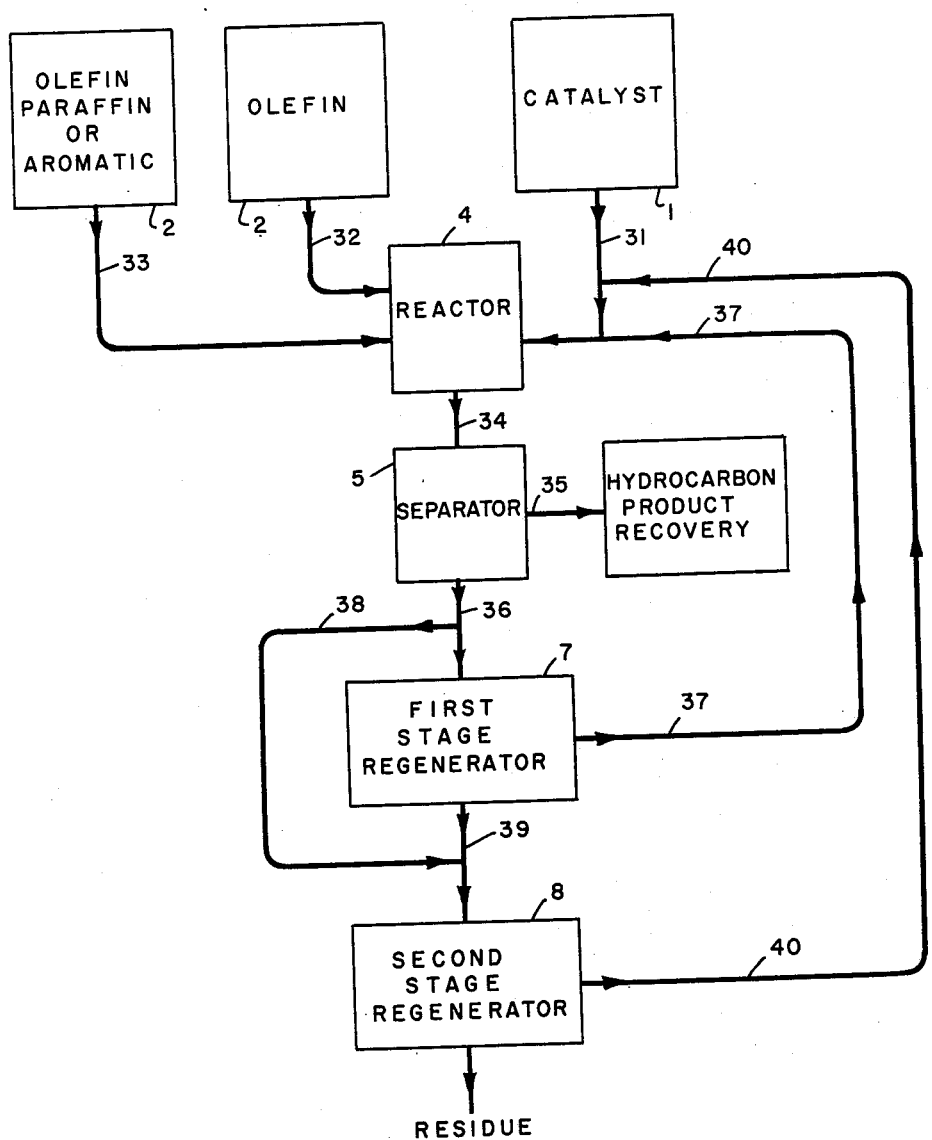
FIG. I
INVENTORS
CLARENCE W. BITTNER
GEORGE HOLZMAN
BY *William H. Myers*
THEIR AGENT

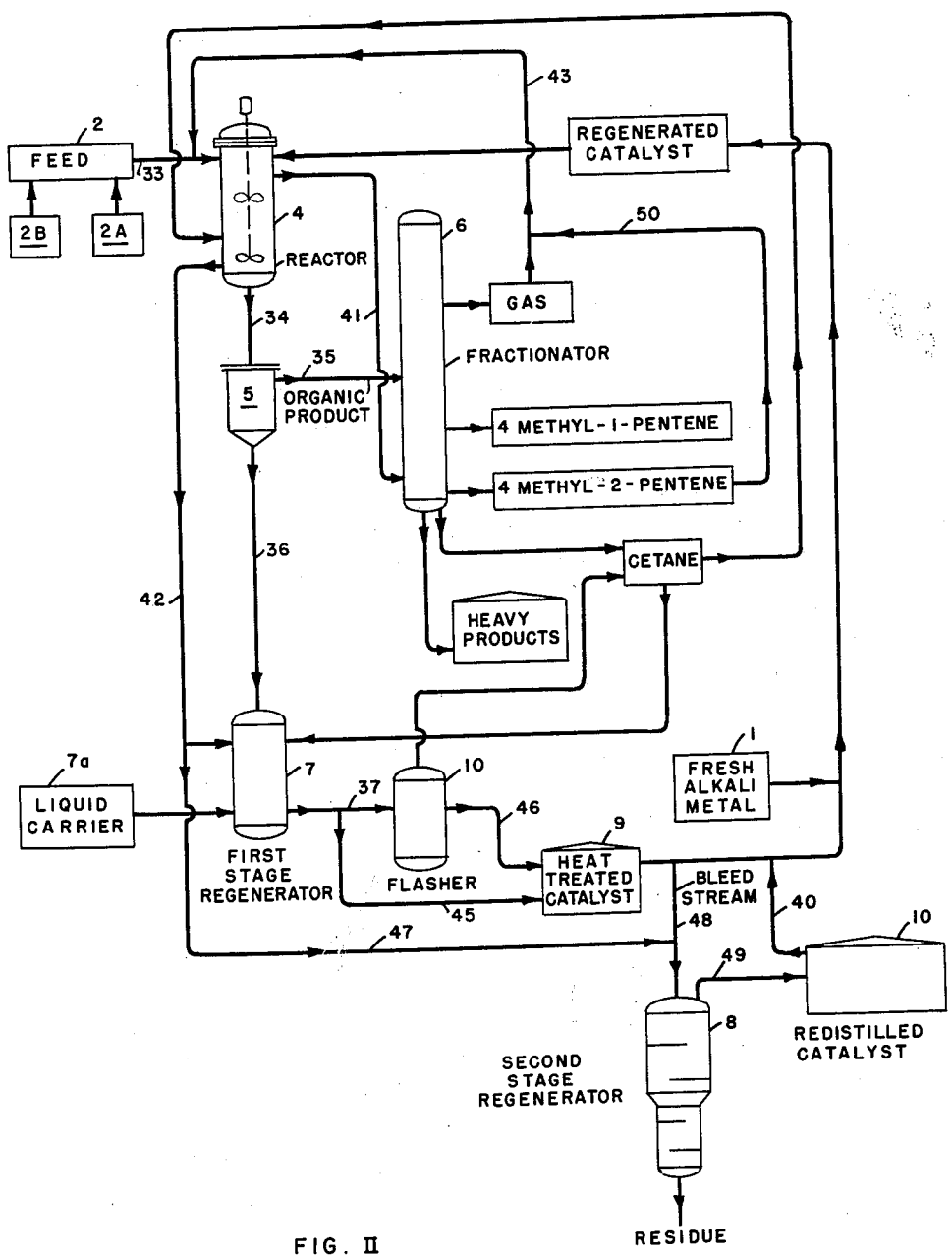
FIG. II

United States Patent Office 3,075,027
Patented Jan. 22, 1963

3,075,027
DIMERIZATION OF PROPYLENE TO
4-METHYL-1-PENTENE
Clarence W. Bittner, Orinda, and George Holzman, Walnut Creek, Calif., assignors to Shell Oil Company, a corporation of Delaware
Filed Nov. 10, 1959, Ser. No. 852,128
2 Claims. (Cl. 260—683.15)

This invention relates to the alkylation of organic compounds using an alkali metal catalyst and to the regeneration of the catalyst. More particularly, it is concerned with the regeneration of alkali metal catalysts utilized in the coupling of certain hydrocarbons.

It is known that it is a peculiar characteristic of the alkali metals that they can form addition compounds with organic compounds containing carbon-carbon, carbon-nitrogen, or carbon-oxygen double bonds. A number of such metalated compounds have been isolated. Organic alkali metal addition compounds are particularly useful as reaction intermediates. A number of chemical reactions are known in which a compound capable of forming a metalated product by reaction with an alkali metal is condensed with another compound in a reaction in which an alkali metal acts as catalyst for the condensation. It is generally believed that the mechanism of these reactions involves the formation of the metalated intermediate of the first-mentioned compound, followed by reaction thereof with the second-mentioned compound. The metalated compounds need not be preformed or isolated in these reactions.

A reaction which is typical of the alkali metal-catalyzed reactions referred to is the alkylation of alkyl side chains of aromatic hydrocarbons with certain olefins. This reaction is described in U.S. Patent 2,448,641 to Whitman. Whitman's reaction required temperatures of 150° to 450° C., pressures of 50 to 3,000 atmospheres and reaction times of 10 to 17 hours. It was thereafter found by Little, U.S. Patent 2,548,803, that the same reaction could be carried out at pressures of 100 to 3,000 atmospheres but at lower temperatures of 0° to 130° C. when using as catalyst a preformed organo-alkali metal compound such as an alkali metal alkyl or an alkali metal aryl. These reactions required 16 hours contact time.

Similar organo-alkali metal compound catalysts were employed by Closson et al. in U.S. 2,728,802. A variety of organic reaction promoters for the alkali metal-catalyzed alkylation of side chains of aromatic compounds were disclosed by Pines et al. in U.S. Patents 2,670,390, 2,688,044, 2,721,885, 2,721,886, and 2,748,178.

Other typical alkali metal-catalyzed reactions are known. The alkylation of side chains of heterocyclic compounds having a nitrogen atom in a six-membered ring is shown in U.S. 2,750,384 to Closson et al. The intercondensation of olefins is shown in U.S. 2,466,694 to Freed. The alkylation of isoparaffins is disclosed in U.S. 2,834,818 to Schmerling et al. It has been noted in the literature that certain supported alkali metal catalysts are unusually active, but, perhaps due to this high activity, their use with olefins results in the production of major amounts of internal olefin dimers with terminal olefin dimers being only a minor by-product.

All of these reactions are characterized in that two molecules interact, in the presence of the catalyst, to form a new compound. One of the reactant molecules must contain a double bond. The other molecule must have a relatively active hydrogen atom. It is preferable that the activity of this hydrogen be at least about equivalent to that of a hydrogen attached to a carbon which is alpha to a ring carbon atom in an aromatic ring. However, under some conditions hydrogens as weak as the tertiary hydrogens of isoparaffins may react.

The activity of hydrogen atoms may be expressed on the well known pK scale. On this scale, the pK of the methyl group hydrogens of toluene is about 37, that of the allylic hydrogens of propylene is estimated to be about 36.5. The hydrogens in ammonia and the bridge hydrogens in diphenylmethane are 35. Compounds having hydrogens whose pK is 37 or lower react most readily in these processes. Those whose pK is between 37 and 40 or higher may also react at suitably severe conditions.

The molecule having an active hydrogen atom is believed to interact with the alkali metal present to form a metalated intermediate which reacts with the molecule containing an olefinic double bond. This metalated intermediate may be relatively stable or very unstable. It is generally not isolated in the condensation reactions of this invention.

At suitably selected conditions the hydrogen atoms of an olefin are sufficiently active that the two interacting molecules can actually be molecules of a single olefinic compound.

In many of the reactions referred to the alkali metal catalyst becomes less active with reuse both with respect to selectivity and with respect to total conversion of reactants. Since one of the principal costs involved in the catalytic conversion referred to comprises the cost of the catalyst itself it becomes important and even essential to regenerate the alkali metal catalyst at least with respect to selectivity and preferably with respect to both selectivity and total activity.

It is an object of this invention to provide an improved process for the regeneration of alkali metal containing catalysts for use in chemical reactions in which metalated compounds act as reaction intermediates. Another object is to provide an improved cyclic process involving alkali metal-catalyzed condensation of compounds containing an active hydrogen atom with organic compounds containing an unsaturated linkage. It is a specific object to provide an improvement in the regeneration of catalysts with respect to selectivity. A further specific object is to provide a process for the regeneration of alkali metal catalysts with respect both to selectivity and to total activity. Other objects will become apparent from the following detailed description of the invention, which will be made with reference in part to the accompanying drawings in which like numerals are used in the different figures to denote like parts, and wherein:

FIG. I is a schematic representation of the process steps; and
FIG. II is a flow diagram of the process.

Now, in accordance with the present invention, a process is provided for the regeneration of unsupported alkali metal catalysts utilized in the above types of condensation reactions which comprises heating said catalyst in the absence of modifying gases such as free hydrogen but in the presence of a substantially inert normally liquid carrier (in other words, in an inert medium) at a temperature between about 200° and about 400° C. for a period of time between about 15 minutes and 24 hours. Again, in accordance with the invention, it has been found that this heat treatment unexpectedly and greatly improves the selectivity of an alkali metal containing catalyst with moderate regeneration of total activity of the catalyst.

When the total activity of the catalyst has decreased to an undesirable extent, at least part thereof may be regenerated under more severe conditions comprising vaporizing the alkali metal from the residue with which it is usually associated after its use in condensation reactions.

A preferred cyclic process therefore comprises utilizing an unsupported alkali metal catalyst in the condensation of organic molecules containing an active hydrogen atom and an organic molecule having a double bond (in some cases the same type of molecule) by contacting the two organic molecules at a temperature between about 100° C. and about 350° C. and at a pressure from about 5 to about 200 atmospheres with a catalytic amount of at least 1 alkali metal catalyst, separating the catalyst from the condensation product so formed, regenerating the separated catalyst by heating at a temperature between about 200 and about 400° C. for a period between about ¼ and 24 hours in the absence of hydrogen and in the presence of a liquid carrier and contacting the regenerated catalyst with further quantities of the condensable organic compounds under the recited condensation conditions. In a further aspect of the invention at least one of the less desired types of by-products from the condensation zone is recycled to the reactor thereto together with regenerated catalyst and additional quantities of fresh feed material for effecting a condensation reaction and at the same time minimizing further production of the undesired side reaction product. The regeneration step appears to result in freeing the catalyst from tarry residue.

In the process under consideration, unsupported alkali metal catalysts, when contacted with olefinic condensable organic compounds, produce a mixture of condensation products predominating in terminal olefin dimers, in contrast to internal olefins which are produced by alkali metal catalyst supported on activated carbon. Out of this mixture usually one or several components are desired while the remainder of the product comprises either unreacted feed materials or undesirable or less desirable condensation products. As the reaction progresses, both the activity of the catalyst and its selectivity for terminal olefin production diminish. Consequently, it is important to regenerate the catalyst and to so regenerate it that the production of the desired condensation product is increased while the ratio of undesired or unreacted components is minimized.

Taking as an illustration the condensation of propylene in the presence of an unsupported alkali metal catalyst, a typical condensation product will contain $C_1$–$C_5$ hydrocarbons, propane, $C_9$ olefins, heavier residues, $C_6$ olefins and particularly 4-methyl-1-pentene and 4-methyl-2-pentene. The former of these last two products is highly desirable since it can be utilized to great advantage in the preparation of the so-called Ziegler polymers. As the unsupported alkali metal catalyst is recycled for the condensation of further quantities of propylene, the ratio of 4-methyl-1-pentene to the corresponding -2-pentene rapidly decreases and shortly reaches an uneconomic level wherein undesirably high quantities of -2-pentene are being produced at the expense of the production of -1-pentene. Regeneration according to the present process comprising heating of this used catalyst at a temperature of from about 200° to about 400° C. for a time from about 15 minutes to 24 hours in the absence of hydrogen but in the presence of a normally liquid inert carrier substantially completely regenerates the catalyst with respect to this ratio of desired to undesired components. In some cases, however, regeneration of total activity (i.e., total amount of conversion products formed under a given set of conditions) is not fully accomplished by this relatively mild treatment. Under some circumstances, therefore, it is economic and desirable to subject at least a portion of the catalyst periodically to harsher conditions whereby the alkali metal is vaporized from the carbonaceous residue with which it is associated prior to recombining with fresh alkali metal or alkali metal regenerated under milder conditions before recycling for the treatment of further portions of the feed organic compounds.

The conditions under which mild regeneration takes place usually comprise heating of the catalyst in the absence of hydrogen for the time and temperature recited either with or without pressure but under conditions where the inert diluent is in the liquid phase; conveniently, regeneration may take place in the autoclave or reactor in which the condensation reaction is conducted. However, under the circumstances of a continuous process it may be more convenient to remove the condensation products and catalyst from the reaction zone, separate them either by centrifuging or filtration, transferring the condensation product to a fractionating zone and separately transferring the catalyst to a regeneration zone. In either case, it is essential to employ an inert liquid carrier for the catalyst since regeneration of selectivity has not been found to occur in its absence. Inert carriers are preferably aliphatic saturated hydrocarbons such as cetane. However, inert gases may be employed in liquefied form. The term "inert" is employed in this instance to mean a carrier which is substantially chemically unaffected by the catalyst under the conditions of regeneration while the two are in contact. The inert carrier is selected in boiling range so that it may be readily separated from the desired products of the reaction. Other examples include (1) isoparaffins from alkylation of isobutane with olefins, such as isooctane, heavy alkylates; (2) n-paraffins such as n-hexane, heptane, cetane, etc.; (3) alicyclic hydrocarbons such as methylcyclopentane, cyclohexane, decalin, alkylated cyclopentanes or cyclohexanes or decalins; and (4) mixtures of acyclic and alicyclic hydrocarbons such as aromatic-free light straight-run gasoline, full range gasoline, gas oils and selected boiling range fractions.

The alkali metals including lithium, sodium, potassium, rubidium and cesium are not equally active as catalysts for the condensations referred to. As a rule, their activity increases with increasing molecular weight. Substantially more active catalyst compositions comprise combinations of alkali metals or mixtures of one or more alkali metals with promoters such as finely divided iron powder. Particularly active and particularly preferred combinations of alkali metals, in decreasing order of preference, are potassium and cesium, lithium and potassium and lithium and cesium. The combination of sodium and cesium, although more active than any single alkali metal, is somewhat less active than the above-named combinations. Mixtures of lithium and sodium are no more active than either metal alone and are substantially less active than either cesium alone or potassium alone. Mixtures of sodium and potassium have an activity of the order of potassium alone and are substantially less active than cesium alone. A particularly suitable unsupported catalyst consists of at least one alkali metal which is more electropositive than sodium and contains no more than about 20 mole percent sodium. When mixtures of alkali metals are utilized the catalyst may contain from 0.02 to ninety-nine mole percent of one of the components, the difference being made up by the other. A concentration of between 10 and 50% of one of the components is generally preferred.

The condensable compounds of the class characterized by an active hydrogen atom, which form metalated reaction intermediates and with which unsaturated organic compounds can be condensed according to the process of this invention, are selected from the following five groups:

(1) The first group consists of cyclic compounds having attached to a nuclear carbon atom, which is attached by a double bond to another nuclear carbon atom, a carbon atom of a hydrocarbyl group to which carbon atom is attached at least one hydrogen atom.

This group of compounds includes carbocyclic aromatic and hydroaromatic compounds and heterocyclic compounds. The carbocyclic compounds may have a benzene, naphthalene, etc. nucleus. The heterocyclic compounds may have a pyridine, furan, thiophene, pyrrole, pyrazole, etc. nucleus. The compounds may contain both a carbocyclic ring and a heterocyclic ring such as is found in indole and in carbazole. The compounds may also contain both a benzene nucleus and a cycloalkane nucleus such as is found in tetralin and in indan. The hydroaromatic compounds preferably contain no geminally-substituted carbon atoms. The cyclic compounds preferred for use contain a saturated side chain attached to a nuclear carbon atom by a saturated carbon atom, that is, a carbon atom that is bonded by univalent bonds to four other atoms. The saturated carbon atom should have at least one hydrogen atom attached to it. The side chain may comprise only one carbon atom, as the methyl group in toluene, or it may comprise a number of saturated carbon atoms in straight-chain or branched-chain relation, such as the normal butyl group or the isobutyl group in normal butylbenzene and in isobutylbenzene, respectively. The substituent need not necessarily be an aliphatic chain; it may be a cycloalkane group as in tetralin or as in cyclohexylbenzene or an aralkyl group, as a benzyl group, as in diphenylmethane.

Suitable cyclic compounds include toluene, ethylbenzene, n-propylbenzene, isopropylbenzene, n-butylbenzene, isobutylbenzene, sec. butylbenzene, m-xylene, o-xylene, p-xylene, mesitylene, methyl naphthalene, tetralin, indan, diphenylmethane, cyclopentylbenzene, cyclohexylbenzene, methylcyclohexylbenzene, methylethylbenzene, 1-methyl-1-cyclohexene, 1-ethyl-1-cyclohexene, 1-propyl-1-cyclohexene, 1,2-dimethyl-1-cyclohexene, 1,4-dimethyl-1-cyclohexene, 1,3,5-trimethyl-1-cyclohexene, etc. The ring in the compounds herein referred to may contain other substituents, such as chloro group, a methoxy group, an ethoxy group, a nitro group, and the like.

(2) Although the alkali metal catalysts used previously do not generally permit appreciable reaction of unsubstituted cyclic compounds, the more active catalysts of this invention permit the direct nuclear alkylation of certain unsubstituted cyclic compounds. The second group of suitable compounds containing active hydrogen according to this invention consists of unsubstituted monocyclic or polycyclic, carbocyclic and heterocyclic compounds of aromatic nature. Included in this group are aromatic hydrocarbons such as benzene, naphthalene, anthracene and the like, and heterocyclics such as pyridine, furan, thiophene, etc.

(3) The third group consists of compounds having an olefinic double bond, including acyclic and cyclic olefins.

This group includes ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, etc., 3-methyl-1-butene, 2-methyl-2-butene, 3-methyl-1-pentene, 3-methyl-2-pentene, 4-methyl-1-pentene, 4-methyl-2-pentene, tetramethylethylene and the like. It also includes cycloolefins, such as cyclopentene, cyclohexene, methylcyclopentene, methylcyclohexene, and the like.

(4) The fourth group consists of ammonia and primary and secondary aliphatic amines. The unsaturated compound is added to the amine nitrogen.

Suitable amines include, for example, methylamine, dimethylamine, ethylamine, diethylamine, methylethylamine, n-propylamine, isopropylamine, dipropylamine, diisopropylamine, and numerous other mono- and di-amines, e.g., octylamine, didecylamine, tetradecylamine, and dioctadecylamine. These compounds can be classified as compounds of the formula $R_1R_2NH$, where $R_1$ and $R_2$ are selected from the group consisting of hydrogen and aliphatic radicals.

(5) The fifth group consists of phosphine and primary and secondary aliphatic phosphines. The unsaturated compound is added to the phosphorus atom.

Suitable phosphines include, for example, methylphosphine, dimethylphosphine, ethylphosphine, and other analogs of the amines mentioned above. These compounds can be classified as compounds of the formula $R_1R_2PH$, where $R_1$ and $R_2$ are selected from the group consisting of hydrogen and aliphatic radicals.

Reactants selected from the above-named groups can be condensed according to the process of this invention with compounds of the class of unsaturated compounds from one of the following three groups:

(1) The first group consists of compounds having a non-aromatic carbon-to-carbon double bond.

Suitable olefinically-unsaturated organic compounds are monoolefins such as ethylene, propylene, 1-butene, 2-butene and isobutylene and other monoolefins of higher molecular weight; non-conjugated dienes such as 2,5-dimethyl-1,5-hexadiene and non-conjugated polyolefins containing more than two pairs of double bonds per molecule. Ethylene is particularly preferred in this group. Other preferred compounds in this group are monoolefins in which the alpha carbon atom adjacent the double bond is a quaternary carbon atom, that is, it contains no hydrogen atoms, such as in 3,3-dimethyl-1-butene. Cyclic olefins are also included, e.g., cyclopentene, cyclohexene, methylcyclopentene, methylcyclohexene, and the like.

(2) The second unsaturated group consists of compounds containing a carbon-oxygen double bond, in which the carbon which is bonded to oxygen does not also contain a hydrogen atom.

Suitable compounds of this type are ketones such as dimethylketone, methylethylketone and ketones of higher molecular weight including cyclic ketones such as cyclohexanone and camphor and diketones such as acetylacetone.

(3) The third unsaturated group consists of carbocyclic aromatics and heterocyclic compounds, including benzene, naphthalene, anthracene, pyridine, furan, thiophene, and the like, and their alkyl-substituted derivatives having at least one nuclear hydrogen. The metalated compound of the first class adds to the nucleus of these compounds.

Not all of the possible reactants of the two general classes are equally reactive. Less reactive reactants of one class may not react with less reactive ones of the other class. For example, ethylene is a particularly reactive unsaturated reactant and will react even with benzene when the preferred catalysts of this invention are employed, whereas higher olefins or cyclic compounds may result in little or no reaction with benzene. The order in which the groups in each class were listed above is arbitrary and of no chemical significance.

In general it will not be necessary to employ organic promoting compounds with the catalyst combinations of this invention. However, organic promoters known to be useful with the alkali metal catalysts of the prior art can also be employed with the present iron-promoted catalysts. The organic promoters are described in the above-named Pines et al. patents and include fused-ring polycyclic aromatic hydrocarbons, acetylenic hydrocarbons, heterocyclic compounds containing a ring consisting of nitrogen and four to five carbon atoms, alcohols, carboxylic acids, ethers, organic nitrates and cyanides, hydrocarbyl halides, and organic peroxy and azo compounds. When organic promoters are employed the reaction is preferably carried out at a lower temperature than in the absence of such promoters.

The condensation reactions are carried out using either batch or continuous types of operation in suitable equipment such as autoclaves or tubular reactors constructed from steel, or glass-lined steel reactors. The process is suitably carried out at a temperature of from about 100° to about 350° C., preferably from 125° to 250° C. and most preferably from 175° to 200° C.

The process pressure is at least about 5 atmospheres absolute, and preferably above about 12 atmospheres. Pressures of 200 atmospheres absolute and higher may be employed.

In the aforementioned condensation reactions it is generally preferred to employ at least a stoichiometric amount and still better an excess of the compound of the first class, i.e., those containing an active hydrogen atom, with respect to the unsaturated compound of the second class.

Referring now to FIG. I which schematically illustrates the various essential steps in this process, an alkali metal catalyst from a source 1 and an organic compound such as an olefin or a mixture of an olefin with another olefin or paraffin or aromatic from source 2 are delivered by lines 31, 32, 33, respectively, to a reaction zone 4. In this reaction zone the catalyst and organic compound react to form a mixture of condensation products which may either be separated by vaporization of the major amount of the products from the reaction zone 4, leaving the alkali metal catalyst behind, or the catalyst and condensation product are conducted by line 34 to a separation zone 5. In this zone the alkali metal catalyst is separated from the hydrocarbon product, the latter being sent by line 35 to a hydrocarbon product recovery zone 6. The separation may be effected by any suitable means, such as a cyclone separator, distillation, filtration or other convenient means dependent upon the temperature conditions and the molecular weight of the products mixed with the catalyst. The separated catalyst is transferred by line 36 to the first stage regenerator 7. In this regeneration zone the catalyst is regenerated in the presence of an inert liquid medium (from a source not shown) by heating at a temperature between about 200 and 400° C. for a period of time between about 15 minutes and about 24 hours. The selectivity of the catalyst with respect to the preferential formation of one or several terminal olefin product species is thus substantially increased and the catalyst is then recycled for further use by means of line 37 for introduction into the reactor 4.

If the total activity of the alkali metal catalyst with respect to total conversion of feed organic compounds is reduced to an undesirable level, at least part of the alkali metal catalyst may be withdrawn such as by means of the bleed line 38 or from the first regeneration zone 7 by means of line 39 and sent to a second stage regeneration zone 8. In this latter zone the catalyst is subjected to high temperature conditions sufficient to vaporize alkali metal which is then returned by means of line 40 for further use in the condensation of further quantities of feed hydrocarbons from source 2.

Referring to FIG. II, fresh alkali metal from source 1 may be introduced, if necessary together with regenerated alkali metal catalyst, and a feed hydrocarbon such as propylene from source 2 into the reactor 4, a stirred autoclave or pipeline reactor. The autoclave is preferably fitted with an agitator or stirrer or is vibrated in order to mix the contents thoroughly. Supersonic vibration may be employed for this purpose. The propylene and alkali metal catalyst (approximately 1 part by weight of catalyst for about 40 or more parts by weight of propylene) are heated with agitation in the autoclave at a temperature in the order of 200° C. for a period of about 0.3–5 hours, the maximum pressure rising in this time to 900–3,000 pounds per square inch. Completion of the condensation between pairs of propylene molecules is indicated by a decrease in the pressure at the maximum reaction temperature to approximately half of the maximum pressure previously attained. One means of separating the catalyst so utilized comprises vaporizing the volatile components of the condensation product through line 41 to the base of a fractionating column 6. The catalyst may then be regenerated in the reactor zone.

The organic product is treated by fractional distillation in fractionator 6 to obtain predetermined products including gas, heavy products, carrier hydrocarbons, such as cetane, and the principal product, namely, 4-methyl-1-pentene. Gases including unreacted propylene taken from the top of the fractionating column 6 also may be recycled by means of line 43 to the reactor. Cetane or other substantially inert carrier hydrocarbon which is recovered during the fractionation from tower 6 may be recycled to the reactor or may be utilized also as a carrier during catalyst regeneration, being conveyed to the first stage regenerator by means of line 44.

The catalyst, sent by means of line 36 to the first stage regenerator, is heated in the presence of an inert liquid carrier from source 7A by a heater not shown to a temperature between about 200 and 400° C., preferably 225–350° C., for a period between about 30 minutes and 24 hours, preferably ½–2 hours. This may be conducted under pressure such as in an autoclave or in a vessel through which a substantially inert gas such as nitrogen is passing to provide an inert atmosphere for the regeneration. The heat treated catalyst is then passed either directly by means of line 45 to a heat treated catalyst storage zone 9 or by way of a flasher 10 for the partial or complete removal of carrier fluids such as cetane and thence by line 46 to the heat treated catalyst storage zone 9.

If the total activity of the alkali metal catalyst has degenerated to such an extent that its use is unsatisfactory even after the mild heat treatment, it may be subjected to distillation, portions at least of the catalyst being taken either by means of line 47 or from the bleed stream line 48 to the second stage regenerator zone 8 wherein it is subjected to heating sufficient to vaporize the catalyst and convey it by means of line 49 to a redistilled catalyst storage zone 10. This redistilled catalyst is then recycled by means of line 40 for use in the condensation of further quantities of the feed propylene, combining it if necessary with make-up quantities of fresh alkali metal and/or further proportions of heat treated catalyst from the storage zone 10 or the first stage regenerator 7. If the catalyst is to be modified with promoters such as iron or the like this must be done prior to recycling to the reactor zone 4.

The nature of the invention is further illustrated by the following examples, which, however, should not be construed to limit the scope of the invention.

EXAMPLE I

A stainless steel autoclave equipped with a magnetic plunger and having a 250 cc. capacity was charged with propylene, cetane and potassium in the amount shown in Table I. The autoclave was closed and then heated as rapidly as possible to about 200° C. The pressure rose as the autoclave was heated to the maximum pressure shown in Table I at which it was held for the approximate time shown in the table. Heating was discontinued and the pressure allowed to drop, indicating completion of the reaction when it had reached the final pressure shown in the table. After cooling to room temperature, the gas was vented to a gas collector for analysis and the liquid contents were recovered and separately analyzed. As will be seen by reference to Table I, both the reactivity and selectivity of the catalyst dropped materially from the favorable conditions experienced in cycle 1 to the results obtained in cycle 2, wherein the catalyst employed in cycle 1 was reused in cycle 2. The catalyst employed in cycle 2 was freed of the condensation product, then mixed with cetane and heated at 350° C. for one hour in the closed autoclave prior to its use in cycle 3. It will be noted that the activity and selectivity of the catalyst were materially improved by this treatment. Prior to reuse of catalyst from cycle 4 in cycle 5, the catalyst contaminated with residue was heated at 350° C. for one hour in an open autoclave protected by a slow stream of nitrogen. It will be noted from Table I that the selectivity of the catalyst was substantially improved by this treatment but that the rate of propylene conversion was relatively low. It is indicated from this that complete separation of the catalyst by means of vaporization thereof from the residue is necessary in order to restore the activity of the catalyst to a satisfactory extent.

TABLE I
Propylene Dimerization—Multicycle Test—Pyrolysis of Residue
[250 cc. Magne Dash autoclave]

| Cycle No | 1 | 2 | 3 a | 4 | 5 b |
|---|---|---|---|---|---|
| Temperature, °C | 203 | 202 | 204 | 203 | 201 |
| Time, Hours | 0.8 | 1.6 | 1.8 | 3.2 | 2.5 |
| Pressure, p.s.i.g., | | | | | |
| Maximum | 930 | 975 | 1,000 | 960 | 1,020 |
| Final | 500 | 670 | 650 | 570 | 1,000 |
| Charge: | | | | | |
| Moles— | | | | | |
| $C_3H_6$ | 1.15 | 1.14 | 1.14 | 1.14 | 1.14 |
| Cetane | 0.30 | 0.30 | 0.30 | 0.30 | 0.30 |
| Grams Catalyst | 3.9K | 3.9K | 3.9K | 3.9K | 3.9K |
| Percent Conversion of $C_3H_6$ | 73 | 49 | 56 | 43 | 6 |
| Products, Percent w. $C_3H_6$ Converted (no-loss basis): | | | | | |
| $C_1+C_2+C_4+C_5$ | 0 | 0 | 1 | 1 | 7 |
| $C_3H_8$ | 15 | 10 | 11 | 8 | 12 |
| 4-Methyl-1-pentene | 53 | 45 | 57 | 44 | 50 |
| 4-Methyl-2-pentene | 16 | 27 | 16 | 24 | 4 |
| Other $C_6$ Olefins | 5 | 5 | 4 | 4 | |
| $C_9$ | 1 | 2 | 1 | 4 | |
| Residue | 10 | 11 | 10 | 15 | 27 |
| Product Ratios: | | | | | |
| 4-Methyl-1-pentene 4-Methyl-2-pentene | 3.3 | 1.6 | 3.6 | 1.8 | 13 |
| 4-Methyl-1-pentene+4-methyl-2-pentene/other $C_6$ olefins | 13.0 | 13.4 | 19.8 | 17.8 | | a Prior to this cycle the potassium plus residue plus cetane were heated at 350° C. for 1 hour in a closed autoclave.
b Prior to this cycle the potassium plus residue were heated at 350° C. for 1 hour in an autoclave open to a slow stream of nitrogen.

EXAMPLE II

When the catalyst and residue from cycle 5 described in Table I above is subjected to heating in the order of 900° C. potassium metal is distilled and collected for use in treatment of further quantities of propylene.

EXAMPLE III

When runs 1-5 of Example I are repeated with a mixture of lithium and potassium, substantial conversions to the desired product 4-methyl-1-pentene were obtained with satisfactory regeneration of the catalyst as described in Example I.

We claim as our invention:

1. A cyclic process for producing predominantly 4-methyl-1-pentene product which comprises dimerizing propylene in the presence of a liquid aliphatic saturated hydrocarbon at a temperature of from about 100° C. to about 350° C. and at a pressure of at least about 5 atmospheres in the presence of a catalytic amount of an unsupported catalyst consisting essentially of an alkali metal which is more electro-positive than sodium and containing no more than about 20 mole percent sodium to form 4-methyl-1-pentene as predominant dimer product, separating the dimer product from the catalyst and said liquid aliphatic saturated hydrocarbon, regenerating the catalyst by heating together said separated catalyst and separated liquid aliphatic saturated hydrocarbon at a temperature in the range of from 225° C. to 350° C. for from ½ to 2 hours in the absence of hydrogen to regenerate the catalyst, and contacting the resulting regenerated catalyst together with said liquid aliphatic saturated hydrocarbon with propylene under the aforesaid dimerization conditions to produce a further amount of 4-methyl-1-pentene.

2. Process according to claim 1 wherein the alkali metal is potassium.

References Cited in the file of this patent

UNITED STATES PATENTS

| | | |
|---|---|---|
| 2,492,693 | Freed | Dec. 27, 1949 |
| 2,836,633 | Esmay et al. | May 27, 1958 |
| 2,881,234 | Esmay et al. | Apr. 7, 1959 |
| 2,986,588 | Schramm | May 30, 1961 |